US005745568A

United States Patent [19]

O'Connor et al.

[11] Patent Number: 5,745,568
[45] Date of Patent: Apr. 28, 1998

[54] METHOD OF SECURING CD-ROM DATA FOR RETRIEVAL BY ONE MACHINE

[75] Inventors: Clint H. O'Connor, Austin; John J. Pearce, Del Valle, both of Tex.

[73] Assignee: Dell USA, L.P., Round Rock, Tex.

[21] Appl. No.: 528,961

[22] Filed: Sep. 15, 1995

[51] Int. Cl.$^6$ ..................................................... H04L 9/00
[52] U.S. Cl. ............................................................. 380/4
[58] Field of Search ................................................. 380/4

[56] References Cited

U.S. PATENT DOCUMENTS

| | | | |
|---|---|---|---|
| 4,433,207 | 2/1984 | Best | 380/4 |
| 4,785,361 | 11/1988 | Brotby | 380/4 |
| 5,371,792 | 12/1994 | Asai et al. | 380/4 |
| 5,398,285 | 5/1995 | Borgelt et al. | 380/4 |
| 5,416,840 | 5/1995 | Cane et al. | 380/4 |

OTHER PUBLICATIONS

Compaq, "SmartStart Installation", Nov. 1994.

*Primary Examiner*—Salvatore Cangialosi
*Attorney, Agent, or Firm*—Skjerven, Morrill, MacPherson, Franklin & Friel, L.L.P.; Stephen A. Terrile

[57] ABSTRACT

A method of securing CD-ROM data for exclusive retrieval by a specified computer system includes the steps of ordering a computer system designating a selected hardware configuration and selected software components and procuring the selected hardware. A hardware identifier is then associated to the selected hardware. The method further includes the step of producing a compact disc read only memory (CD-ROM) containing software program files corresponding to the selected software components. This step includes the substeps of encrypting the software program files using the hardware identifier as an encryption key and writing the encrypted software program files to the CD-ROM. The CD-ROM securing method also includes the step of installing the software programs on the selected hardware including the sub steps of retrieving the hardware identifier associated to the selected hardware, decrypting the software program files using the hardware identifier as a decryption key and installing the decrypted software program files on the hardware.

22 Claims, 6 Drawing Sheets

METHOD OF SECURING CD-ROM DATA FOR RETRIEVAL BY ONE MACHINE

FIELD OF THE INVENTION

This invention relates to the field of computer system manufacturing processes. More specifically, this invention relates to a process for configuring and restricting a computer system software to a specific computer hardware.

BACKGROUND OF THE INVENTION

CD-ROM media is becoming the software distribution medium of choice for software developers and hardware manufacturers. Software piracy and data security have been and continue to be a problem arising with all types of software distribution media. Various copy protection schemes have been attempted with various degrees of success for other types of software media, such as floppy disks. In contrast, CD-ROM media has, in the past, been somewhat immune from software piracy due to the read-only nature of CD-ROMs and the difficulty, mainly due to the expense, of writing CD-ROMs. Previously, CD-ROM writers have been so expensive that software piracy has been rare. However, as the CD-ROM technology matures, the cost of CD-ROM writers is falling to a level at which software copying will become much more prevalent.

Existing schemes for protecting against software copying include encryption of the data written to the CD-ROM. A decryption key is then provided upon payment for the software contained on the CD-ROM. One flaw in this protection scheme is that one legal software user can pay for usage of software and then transfer the decryption key to many other illegal users.

What is needed is a method and apparatus which protects against illegal software copying.

Another problem which arises with respect to software distribution media is that some hardware manufacturers build a wide range of systems including servers, desktop computers, laptops, portables, workstations and the like. Production of multiple CD-ROMs increases production and distribution costs for a computer manufacturer or software developer. Thus, manufacturers typically would like to manufacture only a single, or limited number, of CD-ROMs for distribution of multiple software programs, some of which may or may not be suitable for a particular system produced by the manufacturer. These manufacturers would like to prevent system users from loading a particular software program that is not suitable for a given system.

What is needed is a technique for customizing data retrieval from a single CD-ROM so that a specific program file written to the CD-ROM can be run on only a single computer or a selected class of computer systems.

SUMMARY OF THE INVENTION

In accordance with a first embodiment of the present invention, a method of securing CD-ROM data for exclusive retrieval by a specified computer system includes the steps of ordering a computer system designating a selected hardware configuration and selected software components and procuring the selected hardware. A hardware identifier is then associated to the selected hardware. The method further includes the step of producing a compact disc read only memory (CD-ROM) containing software program files corresponding to the selected software components. This step includes the substeps of encrypting the software program files using the hardware identifier as an encryption key and writing the encrypted software program files to the CD-ROM. The CD-ROM securing method also includes the step of installing the software programs on the selected hardware including the substeps of retrieving the hardware identifier associated to the selected hardware, decrypting the software program files using the hardware identifier as a decryption key and installing the decrypted software program files on the hardware.

In accordance with a second embodiment of the invention, a system for securing CD-ROM data for exclusive retrieval by one computer system includes a computer having a hardware identifier, a compact disc read only memory (CD-ROM) containing encrypted software program files corresponding to selected software components. The encrypted software program files are encrypted using the hardware identifier as an encryption key. The system also includes a software installation program for installing the software program files exclusively on the computer including a routine for retrieving the hardware identifier associated to the selected hardware, a routine for decrypting the software program files using the hardware identifier as a decryption key and a routine for installing the decrypted software program files on the hardware.

The disclosed method has several advantages. One advantage of the method described above is that data on a CD-ROM is secured against unauthorized copying. A further advantage of the disclosed method is that not all of the data on the CD-ROM need be secured against access. Only those portions of the CD-ROM data for which securing is desired is protected.

Still another advantage of the method is that data security is furnished in a flexible manner so that a single specific computer or a specified class of systems is allowed access to data. This flexible implementation of a security scheme provides for limited data access for various purposes. A computer system seller can deny access of software programs to computer systems made by competing computer sellers. Similarly, a computer manufacturer can provide software on CD-ROM that is tailored to the performance of several system models so that a particular model can access only those software programs that are compatible or optimized for the model's hardware configuration. Additionally, access to CD-ROM data can be tailored to a particular computer user so that, for example, only systems in a particular office are allowed access to proprietary data.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION

Figure 1:
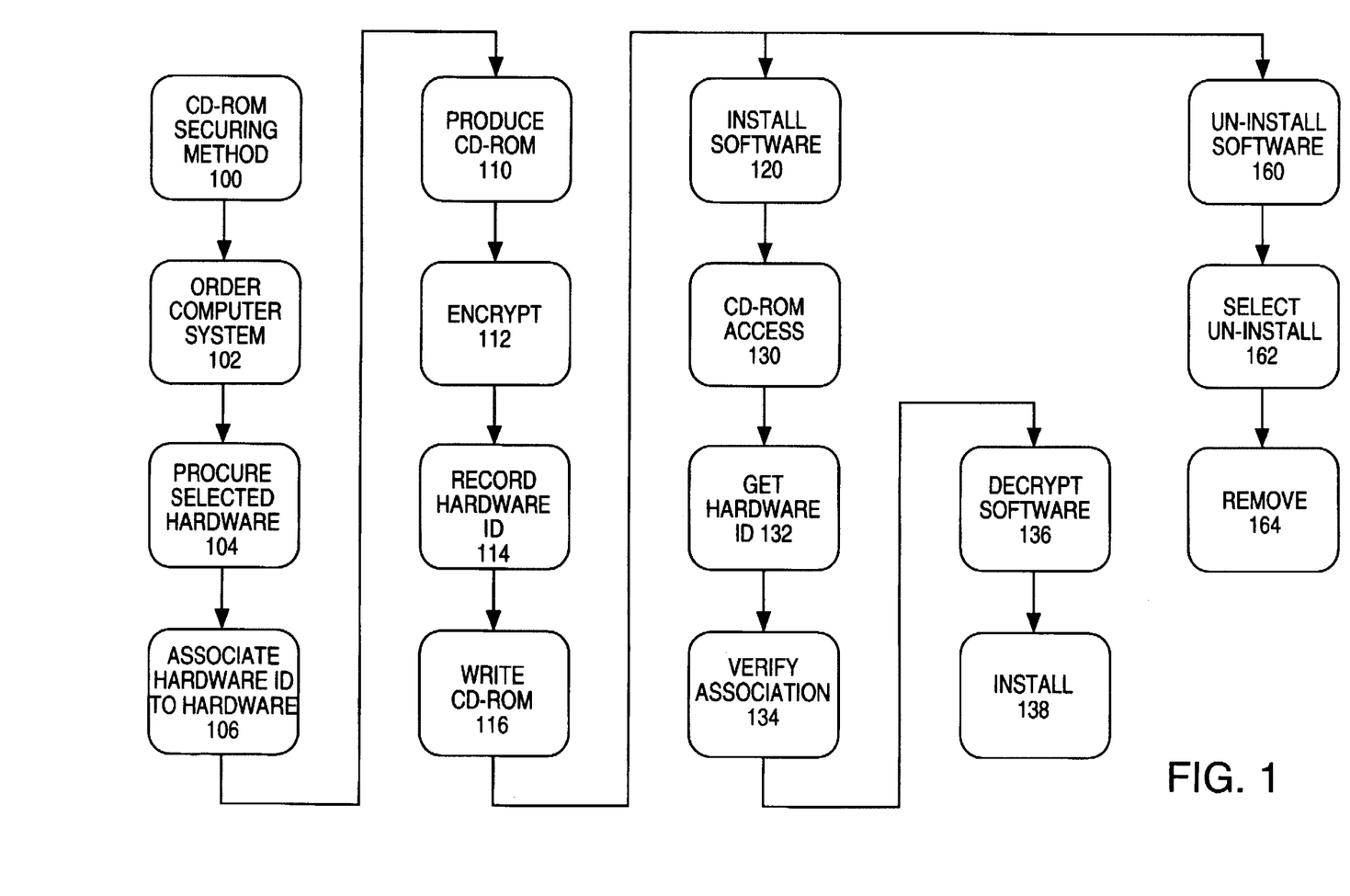
FIG. 1 is a flow chart which illustrates a method of securing CD-ROM data for retrieval by a specified computer system.

Referring to FIG. 1, a flow chart illustrating a method of securing CD-ROM data for retrieval by a specified computer system is shown. With respect to this method, a specified computer system has various representations. For example, the specified computer system is defined inclusively to encompass a single computer, a class of computers, all computers of a certain model, computers built by a specified manufacturer, computers of a group performing a particular task, computers assembled by a customer and the like. A CD-ROM securing method 100 includes the steps of ordering or requisitioning a computer system 102, designating a selected hardware configuration and selected software components. For a computer manufacturer, a step of procuring the selected hardware 104 typically involves manufacture of various hardware components such as a processor, memory and interfaces. For a computer reseller, as well as a manufacturer, the hardware procuring step 104 also includes the step of assembly the computer hardware such as installation of various selected peripheral devices. When the computer hardware is available, a step of associating a hardware identifier to the selected hardware configuration 106 is performed. In different embodiments of the CD-ROM securing method 100, a hardware identifier is associated with a particular computer hardware using various techniques. The hardware components of a computer system are designated by a hardware identifier. In some embodiments, the hardware identifier is a unique identifier which identifies one particular computer hardware unit. An example of a unique hardware identifier is a serial number of a particular processor. In other embodiments, the hardware identifier is a semi-unique identifier which pertains to a group of computer systems, for example, a particular computer model, computer configuration or computer systems produced by a particular manufacturer or system assembler.

Various techniques are used to associate the hardware identifier to the applicable set of hardware components. In one implementation, an identifier is permanently recorded in a non-volatile memory present in the hardware and accessible using a BIOS routine. In another implementation, the identifier is permanently programmed into a segment or multiple segments of a BIOS memory which semi-uniquely identifies a computer system as a member of a group such as a class of computer systems or computer systems produced by a particular manufacturer. One technique for converting a segment or group of segments to a hardware identifier is accomplished using a BIOS routine that performs a checksum operation, as is well known in the art of computing, on the segment or segment group. Alternatively, a BIOS routine converts a segment or group of segments to an identifier by applying a data compression scheme, as is well known in the art of computing, to the segment or segment group. Alternatively, in other embodiments, an identifier conversion routine is included in programming other than BIOS routine programming, such as a routine residing in memory, on disk or on a CD-ROM.

In the produce CD-ROM step 110, a compact disc read only memory (CD-ROM) is produced which contains software program files that correspond to the selected software components. In a first substep of the produce CD-ROM step 110, an encryption step 112 encrypts the software program files using the hardware identifier as an encryption key. A record hardware identifier step 114 writes the hardware identifier to a CD-ROM. This is the same hardware identifier that is associated with the particular computer system hardware and is also permanently stored in the computer system hardware. A write CD-ROM step 116 rites the encrypted software program files to the CD-ROM.

In install software step 120, a CD-ROM access program 130 installs the selected software programs onto the particular computer system hardware that is to be delivered to the customer. The CD-ROM access program 130, in a get hardware identifier routine 132, retrieves the hardware identifier associated to the customer's particular computer system hardware. A verify software-hardware association step 134 reads the hardware identifier written to a loaded CD-ROM, compares the hardware identifier read from the CD-ROM to the hardware identifier retrieved from the computer system hardware and terminates the CD-ROM access program 130 if the hardware identifiers do not match. Otherwise, in decrypt software files routine 136, the hardware identifier is then used as a decryption key to decrypt the software program files. As decryption of each of the files is achieved, the file, restored by decryption, is then installed on the computer system hardware, for example, on a hard disk media, in install software routine 138.

In various embodiments of the CD-ROM securing method 100, a software un-installation step 160 is also available for removing software files from the hard disk media. Software program un-installation is used to remove installed files and data files generated by installed program files.

The software un-installation step 160 includes the substeps of interactively selecting a program un-installing operation which designates software program files to be un-installed in substep 162. In substep 164, the selected software program file is removed from the identified hardware configuration.

The described method of securing CD-ROM data for retrieval by a designated computer system is practiced in many various specific embodiments. The different embodiments include various details with respect to the steps of the general method and characteristics of the CD-ROM media utilized. Preference for a particular specific method over another specific method depends on the characteristics of the computer system, software configuration, what is to be achieved by the security method, and cost/benefit analysis.

Figure 2:
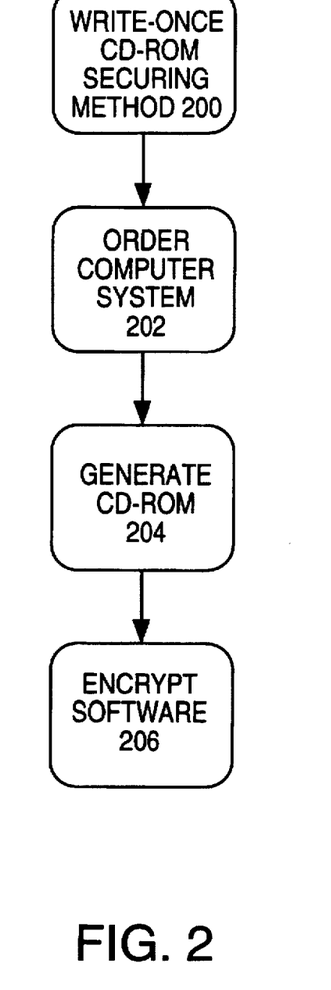
FIG. 2 is a flow chart showing a write-once CD-ROM security method.

In a first exemplary embodiment of the security method shown in FIG. 2, the CD-ROM media of choice is a write-once CD-ROM that is written one time using a CD writer. This method, called a write-once CD-ROM security method 200, is most suitable, for example, for a small manufacturer or system reseller who sells computer systems which are tailored to a particular customer. A customer orders a computer system and specifies a particular set of software programs to be installed on the system. A manufacturer generates a CD-ROM that includes the software programs specified in the order. These software programs are encrypted using, as an encryption key, a computer hardware identifier associated with the particular hardware system that is to be delivered to the customer. The encrypted software programs are written to the particular CD-ROM that is to be delivered to the customer with the hardware system.

In many cases, this first exemplary security method is applicable when the selected hardware configuration is a standalone computer and the hardware identifier is an identifier which is uniquely associated with the standalone computer. An example of such an identifier is a computer component serial number, such as a processor serial number.

In other cases, software programs are secured for usage by a class of computers, utilizing an identifier of the class. An example of such an identifier is a model number of a particular computer system hardware. Any computer users with the same class of computer system is then able to use a CD-ROM which is associated with the class to retrieve a particular software file or group of files. A class-specific association of computer software and hardware is useful, for example, to enable access of a particular model of computer system hardware, which includes a particular hardware driver, to a software driver which is compatible with the particular hardware driver. Accordingly, an incompatible software driver or operating system is not loaded onto a computer. For a class-specific association of software and hardware, a write-once CD-ROM is typically not most appropriate. A mass-produced CD-ROM becomes cost-effective when collections of class-specific software are produced for a class of computer systems that includes a sufficient number of units.

Figure 3:
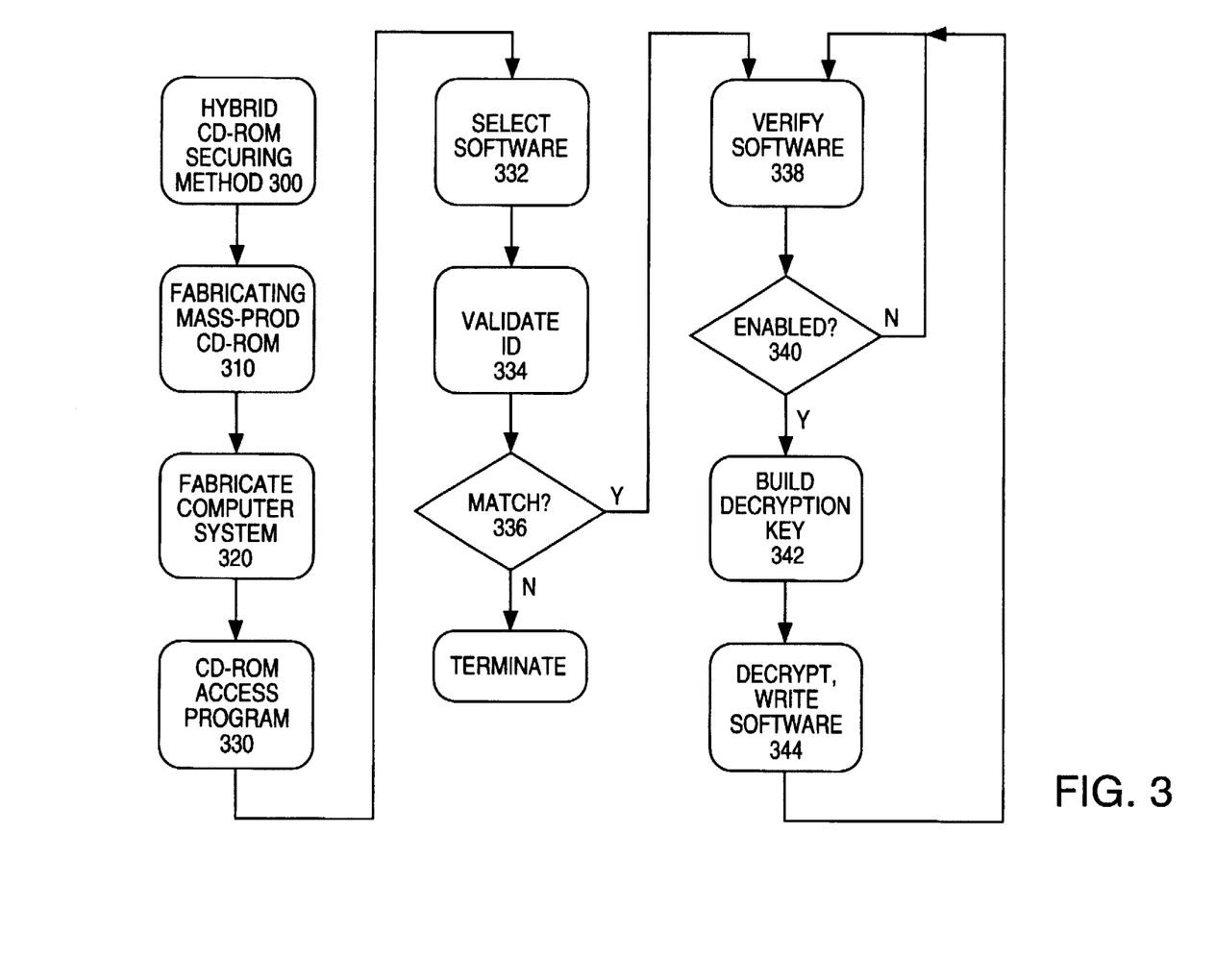
FIG. 3 is a flow chart showing a hybrid CD-ROM security method.
Figure 4:
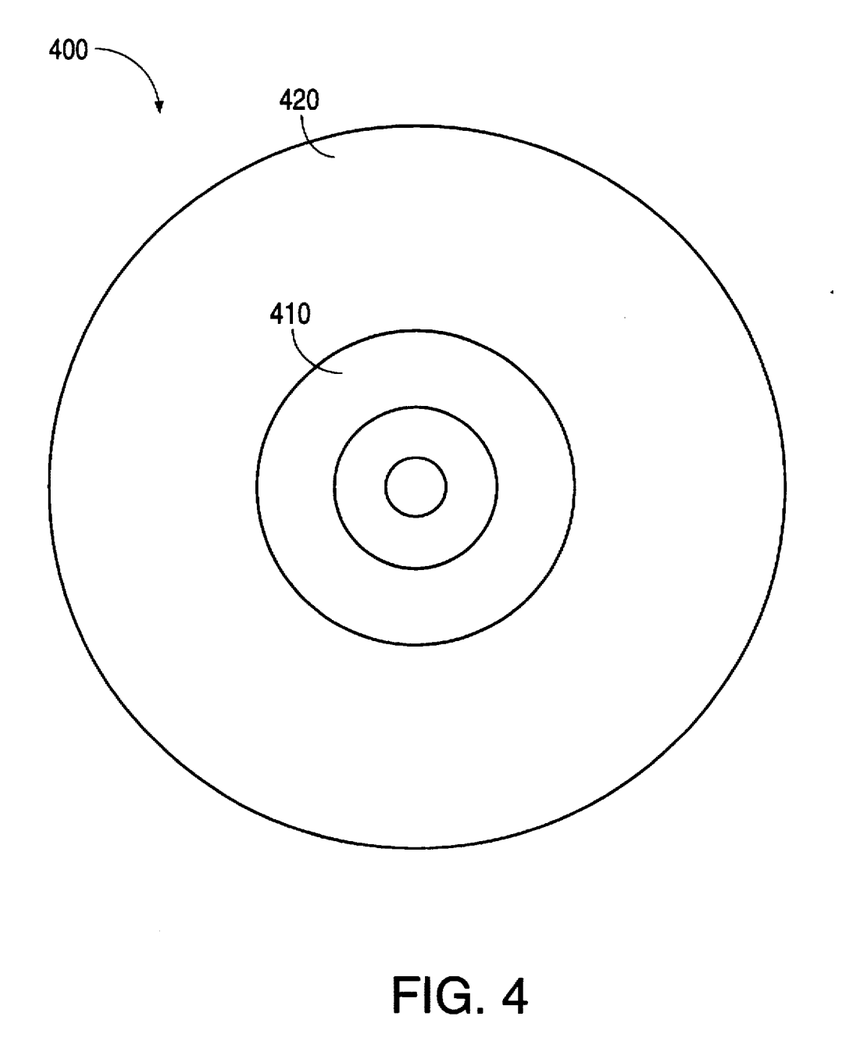
FIG. 4 is a pictorial top view of a hybrid CD-ROM disk.

The first exemplary security method is typically not practiced in circumstances where more than a few CD-ROMs are uniquely-programmed with one set of information due to the labor-intensive nature, high cost and lengthy production times involved with manufacturing programmed write-once CD ROMs. Referring to the flow chart shown in FIG. 3, a second exemplary embodiment of the security method, which reduces the cost and production time of preparing of write-once CD-ROM, employs a special hybrid CD-ROM. The hybrid CD-ROM is manufactured with two rings, an inner ring and an outer ring. A pictorial rendering of the hybrid CD-ROM 400 is shown in FIG. 4. The hybrid CD-ROM 400 includes an inner ring 410 and an outer ring 420. The inner ring 410 is constructed from a special dye-layer substrate, as is commonly employed in write-once CD-ROMs. Customized data, which is tailored to a specific usage, computer or group of computers, is stored in the inner ring 410. The amount of customized data is generally small so that there is little time and cost penalty incurred in programming the inner ring 410 using a write-once CD technology. In a first step of a hybrid CD-ROM security method 300, specifically a fabricate mass-produced CD-ROM step 310, the outer ring 420 is mass-produced in the typical manner by a stamping process. However, the region of the inner ring 410 if left unstamped. The special dye-layer substrate is applied to the inner ring 410 either before or after the stamping process, depending on the CD-ROM manufacturing process which is selected. The mass-produced outer ring 420 normally is stamped with widely-available software packages including, for example, Windows and DOS operating systems, and common user application programs such as Lotus 1-2-3, Microsoft Office and the like. Each of the various software files on the CD-ROM is individually encrypted with a secure key. A manufacturer maintains a stock of mass-programmed CD-ROMs.

In the fabricate computer system step 320, a customer orders a computer system including selected hardware components and selected software files. The manufacturer builds the computer hardware and associates a hardware identifier to the computer hardware, typically by encoding the identifier into the system or using an identifier already in the hardware, such as a serial number. The manufacturer generates a list of selected software file titles. The manufacturer then uses the inner ring 410 write-once section of the CD-ROM to write a code which enables access to the software selections chosen by a customer and to write an encryption key specific to each software selection. The manufacturer also writes a code specifying the computer hardware identifier to the inner ring 410. The hardware identifier may be associated with a specific computer system or may apply to multiple computers. For example, the hardware identifier may identify a specific computer system, a certain model of computer hardware systems, computer systems built by a specific manufacturer, a group of computers enabled for software access by particular users or other defined classes of computer system hardware implementations.

Subsequently, when software from the CD-ROM is to be loaded onto the computer hardware, the CD-ROM is loaded onto the hardware and the user enters a CD-ROM access program in step 330. The user selects the titles of software files to be loaded onto the computer hardware in step 332. The selected titles are typically a subset of the software files which are enabled on the CD-ROM. The CD-ROM access program compares the computer hardware identifier code written to the CD-ROM against the computer hardware identifier associated with the hardware in step 334. If the hardware identifier specified on the CD-ROM does not match that encoded on the hardware as is determined by logic block 336, the CD-ROM access program is terminated. Otherwise, for each software title selected in step 332, the selected software title is checked against the list of enable software files recorded on the CD-ROM in step 338. If the software file is not enabled, as is determined by logic block 340, the CD-ROM access program loops back to step 338. If the software file is enabled, a decryption key which is specific for the particular software file is built in step 342. The decryption key is built using the encryption key stored on the CD-ROM and the hardware identifier. The software file is then decrypted from the encrypted file stamped on the mass-produced outer ring 420 of the CD-ROM and written to the hard drive of the computer hardware in step 344. The CD-ROM access program then loops to step 338 to access another selected software tide until all the selected software titles have been loaded or denied access to the computer hardware.

The hybrid CD-ROM security method 300 is typically used by a larger computer manufacturer or reseller.

Figure 5:
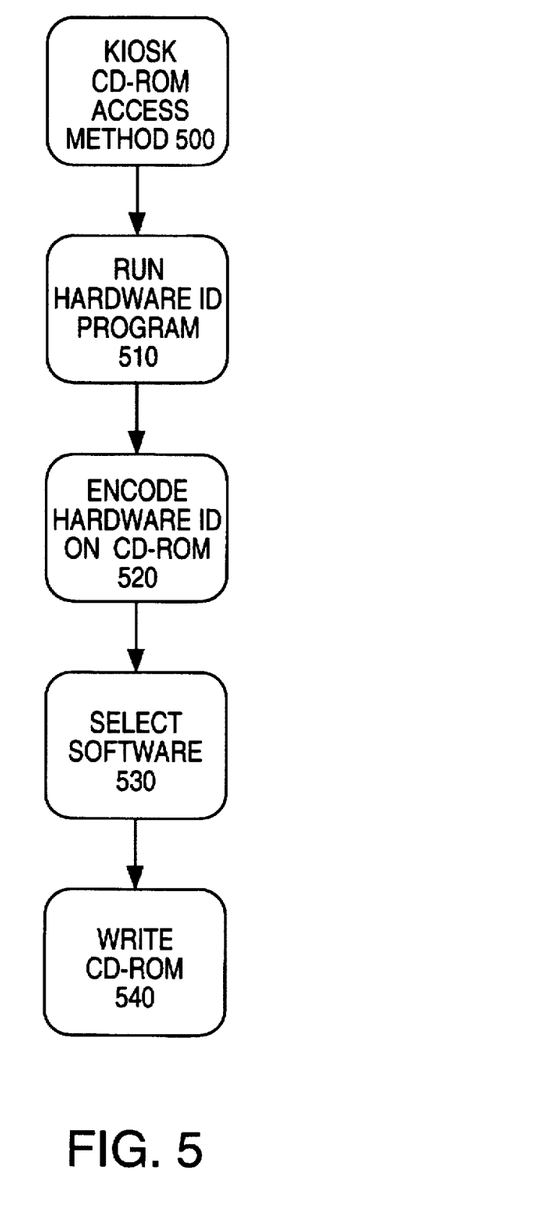
FIG. 5 is a flow chart describing a kiosk CD-ROM access method.

Both the write-once CD-ROM security method 200 and the hybrid CD-ROM security method 300 are advantageously used, for example, by software retail stores to deliver software upon demand to a customer using a kiosk CD-ROM access method 500, which is described with reference to FIG. 5. A hardware identification program, typically made available to the customer free of charge, is run on a customer's target computer system hardware in step 510. For example, the hardware identification program may be written to a floppy disk which is given to the customer and run on the customer's target computer hardware. Alternatively, the hardware identification program is loaded, perhaps by modem onto the customer's target computer hardware. The hardware identification program includes a search program which retrieves a unique computer hardware identifier that is already encoded on the customer's target computer system. Alternatively, if the customer's target computer system does not have a unique hardware identifier available, the hardware identification program also includes a hardware identifier build routine which builds a unique identifier for the target computer system. If a class identifier is desired by the customer for a particular target computer system, the hardware identifier build routine can be run to build a class identifier even if the computer already has a unique hardware identifier. The hardware identifier is then recorded, typically by writing the hardware identifier on the floppy disk containing the hardware identification program. In other embodiments, the hardware identifier is recorded, perhaps by transmitting the identifier by modem to a computer system set up to record the identifier. Alternatively, the customer can enter the hardware identifier directly if it is known (for example, serial number for some manufacturers).

In encode hardware identifier on CD-ROM step 520, the customer makes the hardware identifier accessible for writing onto a CD-ROM. Typically, the customer carries the floppy disk containing the hardware identification program and hardware identifier to a software retailer. In other embodiments, the hardware identifier, having been transmitted by modem to the computer system set up to record the identifier, is already accessible by the software retailer. The customer then selects various software program files in step 530. This selection is made, for example, through an automated kiosk or a sales representative. A custom CD-ROM is then written by the software retailer using a CD-ROM writer in step 540. The CD-ROM is written with the hardware identifier and encrypted software in accordance with the write-once CD-ROM security method 200 and the hybrid CD-ROM security method 300. Information supplied through the hardware identification program, using the floppy disk or other method of data communication, is used to write custom information to the CD-ROM. The software retailer then furnishes the CD-ROM and such accessories as manuals and other papers to the customer. The CD-ROM serves as a permanent backup which is specific to a particular computer hardware or class of computer hardware. Both the write-once CD-ROM security method 200 and the hybrid CD-ROM security method 300 are more labor-intensive and involve higher cost and a more lengthy production time than methods which utilize a standard mass-produced CD-ROM. A third alternative CD-ROM security method, called a mass-programmed CD-ROM security method 600, is described with reference to FIG. 6. A first step 610 of the mass-programmed CD-ROM security method 600 involves encryption and writing of a catalog of software on a CD-ROM. Each computer system hardware that is capable of accessing the software files on the CD-ROM includes a nonvolatile, preferably noneraseable, memory which is factory-programmed with a unique computer system hardware identifier in step 620. Each computer system hardware is also programmed with bits or fields designating the software files that are purchased with the computer system hardware in step 630. The enabled CD-ROM software files are written to the hard disk of the computer system hardware in step 640 using a program similar to or the same as the previously described CD-ROM access program which verifies whether the computer system hardware has access to a particular software file on the CD-ROM and, if access is granted, builds a decryption key and installs the software files.

Figure 6:
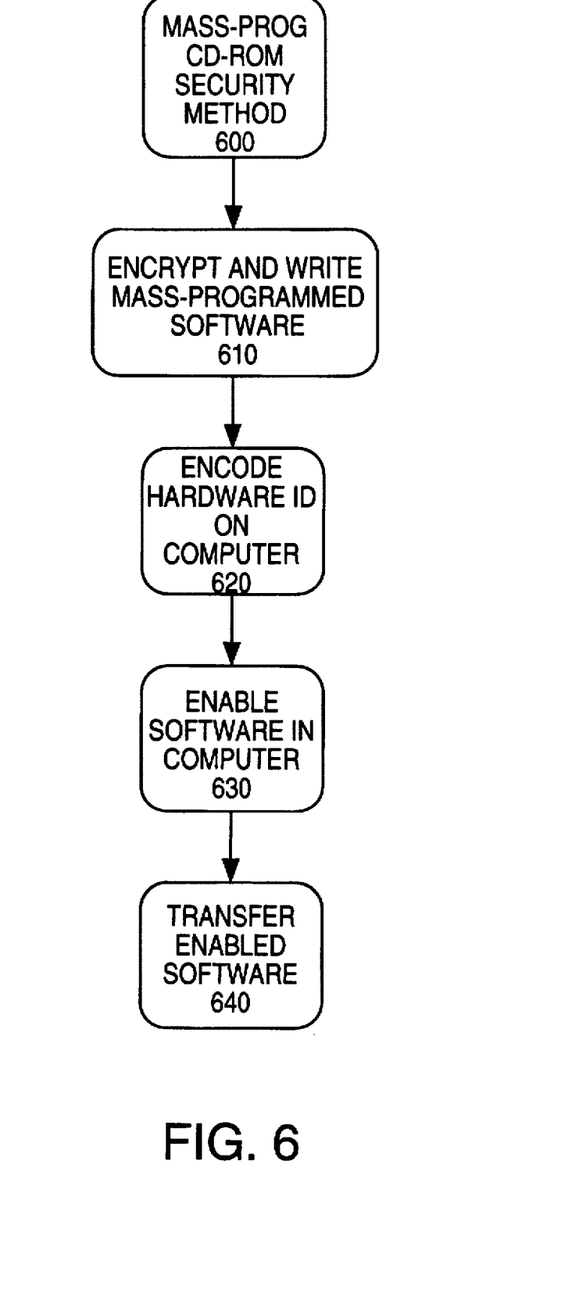
FIG. 6 is a flow chart depicting a mass-programmed CD-ROM security method.

One variation of the write-once CD-ROM security method 200, the hybrid CD-ROM security method 300 and the mass-programmed CD-ROM security method 600 involves accessing of optional programs or application software that a manufacturer or computer reseller wishes to distribute for an extra charge. The customer calls the manufacturer and obtains a software key for accessing desired software files. This software key is derived using a program, usable only by the manufacturer or reseller, which accesses the customer's computer system hardware identifier. The customer can provide this information over the telephone for some manufacturers. The customer receives this software key and enters the software key for access by the CD-ROM access program. The CD-ROM access program uses the computer system hardware identifier to generate a decryption key. If the computer hardware identifier does not match the hardware identifier communicated from the customer to the manufacturer, an incorrect decryption key results so that the software is not accessible. If the computer system hardware identifier does match the identifier communicated to the manufacturer, the decryption key is used by the customer to access files on a CD-ROM containing the optional programs or application software, which is freely made available at little or no charge by a manufacturer.

Thus, although any person has access to the encrypted CD-ROM, only those customers who pay to receive a decryption key, can access the software files on the CD-ROM.

While the invention has been described with reference to various embodiments, it will be understood that these embodiments are illustrative and that the scope of the invention is not limited to them. Many variations, modifications, additions and improvements of the embodiments described are possible. For example, although the disclosed embodiment describes protection of data on CD-ROM media, data on other portable storage media, such as floppy disks, digital and analog tape and cassette media, and the like, may be similarly protected.

What is claimed is:

1. A method of securing data on a storage medium for exclusive retrieval by a specified computer system comprising the steps of:

requisitioning a computer system designating a selected hardware configuration and selected software components;

procuring the selected hardware;

associating a hardware identifier to the selected hardware;

programming a storage medium containing software program files corresponding to the selected software components including the steps of:

encrypting the software program files using the hardware identifier as an encryption key; and writing the encrypted software program files to the storage medium; and installing the software programs on the selected hardware including the steps of:

retrieving the hardware identifier associated to the selected hardware;

decrypting the software program files using the hardware identifier as a decryption key; and installing the decrypted software program files on the hardware.

2. A method according to claim 1, wherein:

the storage medium programming step further includes the step of:

writing the hardware identifier to the storage medium; and the hardware identifier retrieving step further comprises the steps of:

retrieving the hardware identifier from the hardware;

reading the hardware identifier written on the storage medium;

comparing the hardware identifier retrieved from the hardware to the hardware identifier read from the storage medium; and terminating the software program installing step when the hardware identifier retrieved from the hardware is different from the hardware identifier read from the storage medium.

3. A method according to claim 1, wherein the software program installing step further comprises the steps of:

selecting a program un-installing operation designating a software program file for un-installation;

un-installing the designated software program file for un-installation from the hardware.

4. A method according to claim 1, wherein:
the selected hardware is a standalone computer; and
the hardware identifier is an identifier uniquely associated with the standalone computer.

5. A method according to claim 1, wherein:
the selected hardware is a standalone computer; and
the hardware identifier is an identifier semi-uniquely associated with the standalone computer.

6. A method according to claim 1, wherein:
the selected hardware is a class of computer hardware including plurality of standalone computers; and
the hardware identifier is a computer hardware class identifier.

7. A method according to claim 1, wherein:
the storage medium is a floppy disk.

8. A method according to claim 1, wherein:
the storage medium is a magnetic disk.

9. A method of securing CD-ROM data for exclusive retrieval by a specified computer system comprising the steps of:
requisitioning a computer system designating a selected hardware configuration and selected software components;
procuring the selected hardware;
associating a hardware identifier to the selected hardware;
producing a compact disc read only memory (CD-ROM) containing software program files corresponding to the selected software components including the steps of:
encrypting the software program files using the hardware identifier as an encryption key; and
writing the encrypted software program files to the CD-ROM; and
installing the software programs on the selected hardware including the steps of:
retrieving the hardware identifier associated to the selected hardware;
decrypting the software program files using the hardware identifier as a decryption key; and
installing the decrypted software program files on the hardware.

10. A method according to claim 9, wherein:
the CD-ROM producing step further includes the step of:
writing the hardware identifier to the CD-ROM; and
the hardware identifier retrieving step further comprises the steps of:
retrieving the hardware identifier from the hardware;
reading the hardware identifier written on the CD-ROM;
comparing the hardware identifier retrieved from the hardware to the hardware identifier read from the CD-ROM; and
terminating the software program installing step when the hardware identifier retrieved from the hardware is different from the hardware identifier read from the CD-ROM.

11. A method according to claim 9, wherein the software program installing step further comprises the steps of:
selecting a program un-installing operation designating a software program file for un-installation;
un-installing the designated software program file for un-installation from the hardware.

12. A method according to claim 9, wherein:
the selected hardware is a standalone computer; and
the hardware identifier is an identifier uniquely associated with the standalone computer.

13. A method according to claim 9, wherein:
the selected hardware is a standalone computer; and
the hardware identifier is an identifier semi-uniquely associated with the standalone computer.

14. A method according to claim 9, wherein:
the selected hardware is a class of computer hardware including plurality of standalone computers; and
the hardware identifier is a computer hardware class identifier.

15. A method according to claim 9, wherein:
the CD-ROM is a two-ring CD-ROM having a mass-programmed outer ring and a write-once inner ring; and
the encrypting step includes a step of writing a code derived from the hardware identifier to the write-once inner ring.

16. A system for securing data on a storage medium for exclusive retrieval by one computer system comprising:
a computer having a hardware identifier;
a storage medium containing encrypted software program files corresponding to selected software components, the encrypted software program files being encrypted using the hardware identifier as an encryption key; and
a software installation program for installing the software program files exclusively on the computer including:
a routine for retrieving the hardware identifier associated to the selected hardware;
a routine for decrypting the software program files using the hardware identifier as a decryption key; and
a routine for installing the decrypted software program files on the hardware.

17. A system for securing CD-ROM data for exclusive retrieval by one computer system comprising:
a computer having a hardware identifier;
a compact disc read only memory (CD-ROM) containing encrypted software program files corresponding to selected software components, the encrypted software program files being encrypted using the hardware identifier as an encryption key; and
a software installation program for installing the software program files exclusively on the computer including:
a routine for retrieving the hardware identifier associated to the selected hardware;
a routine for decrypting the software program files using the hardware identifier as a decryption key; and
a routine for installing the decrypted software program files on the hardware.

18. A method of securing CD-ROM data for exclusive retrieval by a specified computer system comprising the steps of:
selecting a computer system including a selected computer hardware and a selected plurality of software program files;
assembling a computer hardware in accordance with the selecting step;
identifying the computer hardware by defining a hardware identifier and encoding the hardware identifier onto the computer hardware;
producing a write-once CD-ROM including the substeps of:
encrypting each of the plurality of selected software program files using the hardware identifier as an encryption key;

writing each of the encrypted software program files to a write-once CD-ROM; and writing the hardware identifier to the write-once CD-ROM; and installing the selected plurality of software program files on the selected computer hardware.

19. A method according to claim 18, wherein the step of installing the software program files further comprises the steps of:

retrieving the hardware identifier from the hardware;

reading the hardware identifier written on the write-once CD-ROM;

comparing the hardware identifier retrieved from the hardware to the hardware identifier read from the write-once CD-ROM;

terminating the software program installing step when the hardware identifier retrieved from the hardware is different from the hardware identifier read from the write-once CD-ROM;

reading software program files from the write-once CD-ROM;

decrypting the software program files using the hardware identifier as the decryption key; and transferring the decrypted files to a storage medium on the computer hardware.

20. A method of securing CD-ROM data for exclusive retrieval by a specified computer system comprising the steps of:

mass-programming a plurality of widely-available software program files on a ring of a hybrid CD-ROM, the software program files being individually encrypted using a corresponding plurality of encryption keys;

selecting a computer system including a selected computer hardware and a software program file selected from the plurality of widely-available software program files;

assembling a computer hardware in accordance with the selecting step;

identifying the computer hardware by defining a hardware identifier and encoding the hardware identifier onto the computer hardware;

producing a hybrid CD-ROM from a mass-programmed hybrid CD-ROM including the substeps of:
  enabling for access the selected software program file by writing a software selection code to a write-once ring of the hybrid CD-ROM; and
  writing the hardware identifier to the write-once ring of the hybrid CD-ROM; and installing the selected plurality of software program files on the selected computer hardware.

21. A method according to claim 20, wherein the step of installing the software program files further comprises the steps of:

retrieving the hardware identifier from the hardware;

reading the hardware identifier written on the write-once ring of the hybrid CD-ROM;

comparing the hardware identifier retrieved from the hardware to the hardware identifier read from the write-once ring of the hybrid CD-ROM;

terminating the software program installing step when the hardware identifier retrieved from the hardware is different from the hardware identifier read from the write-once ring of the hybrid CD-ROM;

reading the software selection code from the write-once ring of the hybrid CD-ROM;

reading software program files from the mass-programmed ring for files enabled by a code on the write-once ring of the CD-ROM;

building a decryption key based on the mass-programmed encryption key;

decrypting the software program files using the decryption key; and transferring the decrypted files to a storage medium on the computer hardware.

22. A method of securing CD-ROM data for exclusive retrieval by a specified computer system comprising the steps of:

procuring a mass-produced CD-ROM including a plurality of widely-available software program files, the software program files being individually encrypted using a corresponding plurality of encryption keys;

selecting a computer system including a selected computer hardware and a software program file selected from the plurality of software program files;

assembling a computer hardware in accordance with the selecting step; identifying the computer hardware by defining a hardware identifier and encoding the hardware identifier onto the computer hardware;

enabling for access the selected software program file by writing a software selection code to a nonvolatile memory in the computer hardware; and installing the selected plurality of software program files on the selected computer hardware.

* * * * *